United States Patent [19]

Bunes

[11] 4,403,072

[45] Sep. 6, 1983

[54] ALKOXYETHANOLS AS SOLVENTS FOR COUPLING SULFONYL HALIDES TO POLYMERIC AMINES

[75] Inventor: Leonard A. Bunes, San Carlos, Calif.

[73] Assignee: Dynapol, Palo Alto, Calif.

[21] Appl. No.: 300,619

[22] Filed: Sep. 9, 1981

[51] Int. Cl.³ .......................... C08F 8/34; C08F 8/12
[52] U.S. Cl. .............................. 525/353; 525/328.2; 525/355
[58] Field of Search ................... 525/355, 353, 328.2

[56] References Cited

U.S. PATENT DOCUMENTS 4,018,826  4/1977  Gless, Jr. .......................... 525/344

*Primary Examiner*—C. A. Henderson
*Attorney, Agent, or Firm*—Burns, Doane, Swecker & Mathis

[57] ABSTRACT

2-Alkoxyethanols, particularly 2-methoxyethanol and 2-ethoxyethanol, aqueous solvents based thereon are disclosed as advantageous solvents for the liquid phase coupling of sulfaryl halides to polymeric amines.

8 Claims, No Drawings

ALKOXYETHANOLS AS SOLVENTS FOR COUPLING SULFONYL HALIDES TO POLYMERIC AMINES

BACKGROUND OF THE INVENTION

1. Field of the Invention

This invention relates to an improved process for coupling organic groups to polymers. More particularly, it concerns an improvement in the coupling of aromatic groups to polymers via sulfonamide linkages. In a preferred embodiment, it applies this improvement to the preparation of polymeric pharmaceuticals.

2. Discussion of Prior Art

The following U.S. patents are commonly assigned herewith, and are believed representative of references relating to the present invention;

U.S. Pat. No. 3,920,855—Dawson, et al.
U.S. Pat. No. 4,190,716—Parkinson, et al.
U.S. Pat. No. Re. 30,362—Gless, et al.

These references disclose that a polymer containing alkylamine groups, such as poly(vinylamine) can undergo reaction with sulfonyl halide-bearing moieties in a "Schotten-Baumann" type reaction, that is,

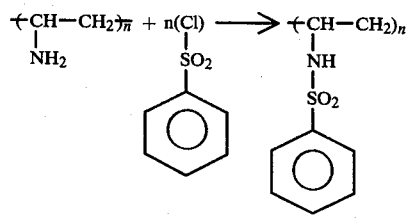

This reaction is disclosed in the preparation of polymeric colorants and their precursors, and polymeric drugs—materials of clear utility. In these cited references, it is disclosed that the reaction is carried out in an aqueous solvent; preferably a water-polar organic solvent system. A variety of such organic solvents, including THF, diglyme, dioxane, dimethoxyethane, isopropanol, and t-butanol are disclosed. In practice, THF has been the cosolvent of choice. We undertook to find a replacement for THF in view of the material's flammable-ether nature.

STATEMENT OF THE INVENTION

It has been found that one particular class of polar organic liquids is uniquely advantageous as a solvent or aqueous cosolvent for the Schotten-Baumann coupling of aromatic sulfonyl halides to alkylamine polymers. These liquids are 2-alkoxyethanols, R—O—CH$_2$—CH$_2$—OH, wherein R is a lower alkyl. Certain of these are also commonly referred to by their tradenames, methyl Cellosolve ® and ethyl Cellosolve ®.

DETAILED DESCRIPTION OF THE INVENTION

The use of 2-alkoxyethanols as solvents for the Schotten-Baumann coupling reaction offers the expected reduction of fire hazard but unexpectedly provides two important process improvements. First, it permits the coupling to carried out in a homogeneous liquid phase. With water alone and with many alternative solvents such as alcohols solubility of the feed polymer or the coupled product polymer is marginal such that a slurry or emulsion exists at some point as reaction takes place. Second, the product solution, when solvented with 2-alkoxyethanol in accord with this invention, can be used in the next processing steps in the production of polymeric dyes or drugs without treatment. That is, the 2-alkoxyethanol does not interfere with later processing steps and does not need to be removed. THF, on the other hand, does in many cases interfere and must be very completely removed prior to the next reaction step. Additionally, the inertness and excellent solubilizing properties of 2-alkoxyethanol permit unpurified polymer feedstocks to be used.

The 2-alkoxyethanols employed are defined to include lower alkoxyethanols that is with 1 through 4 carbon alkoxy groups. Preferred alkoxyethanols are 2-methoxy and 2-ethoxyethanol with 2-methoxyethanol being more preferred.

The 2-alkoxyethanol is generally employed as a mixture with water, preferably a mixture containing at least abot ⅓ 2-alkoxyethanol and more preferably, a mixture containing from 40 to 90%—especially 40 to 70% by volume 2-alkoxyethanol.

The use of 2-alkoxyethanol solvent for coupling finds good use in the coupling of aromatic sulfonyl halides to amine-group-containing polymers. Aromatic sulfonyl halides may be represented by the structural formua shown at I.,

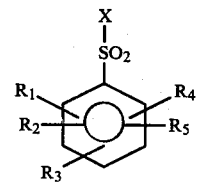

wherein X is a halogen, preferably F, Cl, Br or I, and more preferably, Cl; and R$_1$ through R$_5$ are independently selected from among hydrogens, esters, sulfonates, carboxyls, amides, alkyls totally to up to 8 carbon and the like. Alkyls can be substituted with esters, carboxyls, sulfonates, and the like, as well. Preferably the aromatic sulfonyl halide contains one six carbon aromatic ring and up to three R substituents selected from sulfonates, esters, and amides with the rest being hydrogens. We particularly prefer to use the sulfonyl halides listed in Table I because they directly relate to products of particular interest and utility.

TABLE I

| Sulfonyl Halide | Backbone | Product |
|---|---|---|
| 4-NHAc-C$_6$H$_4$-SO$_2$X (X = Cl, Br or I) | Poly(vinylamine) Salt $M_p^{ps}$ 1 × 10$^4$–5 × 10$^5$ | $-(CH-CH_2)_n-$ with NH-SO$_2$-C$_6$H$_4$-N=N-C$_6$H$_3$(OH)(CO$_2^-$M$^+$); M$^+$ = Na$^+$ or K$^+$ |
| 4-NHAc-C$_6$H$_4$-SO$_2$X | Poly(N—methyl vinyl amine) | $-(CH-CH_2)_n-$ with N(CH$_3$)-SO$_2$-C$_6$H$_4$- ; as above or as the polymeric dyes shown in U.S. Pat. No. 4,000,118 (Incorporated by reference) |
| 4-OAc-C$_6$H$_4$-SO$_2$X | poly(allylamine) | $-(CH-CH_2)-$ with CH$_2$-NH-SO$_2$-C$_6$H$_4$-OAc (or products above) |
| 2-CH$_3$-4-NHAc-5-OCH$_3$-C$_6$H$_2$-SO$_2$X | poly(ethyleneimine) | $-(CH_2-CH_2)_n-$ with NH-SO$_2$-C$_6$H$_2$(CH$_3$)(OCH$_3$)(NHAc) (or products above) |

TABLE I-continued

| Sulfonyl Halide | Backbone | Product |
|---|---|---|
| X–SO₂–C₆H₄–NHC(=O)–C₆H₅ | linear poly(ethyleneimine) | ⟵CH₂—CH₂—N⟶ₙ with SO₂–C₆H₄–NHC(=O)–C₆H₅ substituent on N |
| X–SO₂–C₆H₄–OAc | poly(diallylamine) | ⟵CH—CH₂—CH⟶ₘ ring with CH₂–N(SO₂–C₆H₄–OAc)–CH₂ |

(or products above)

Table I also lists representative backbones which may be used or interchanged in these advantageous products. In general terms, however, the backbones employed are organic polymeric backbones bearing alkyl amine groups. These materials are represented generally by the structures

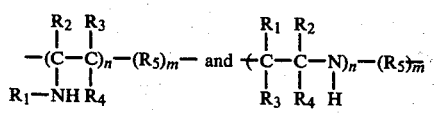

as well as the "diallylamine" structure. In these formulae $R_1$, $R_2$, $R_3$ and $R_4$ are independently selected from among hydrogen and 1 to 4 carbon alkyls; $R_5$ is an optional copolymeric unit which may be selected from the wide range of inert and active copolymeric groups including for example ethylene, propylene, styrene, vinyl sulfonate, acrylic acid, vinyl alcohol, and the like; n is an integer from about 10 to 10,000 preferably from about 50 to 10,000 and m is an integer from 0 to about 20,000 such that the ratio of m/n may be as low as 0 or as high as about 10, preferably from 0 through 5.

The solvent of this invention is employed in the "Schotten-Baumann" coupling reaction. The conditions for this reaction include a moderate temperature, such as from 0° to 50° C., preferably from 5° C. to 35° C., more preferably from 10° C. to 30° C.; and mildly basic pH, such as from pH 8 to 11, preferably from 9 to 10.5.

The invention will be further illustrated by the following examples. These are provided to make clear the invention and are not to be interpreted as limiting its scope.

EXAMPLE I

Use of 2-methoxyethanol in the preparation of a polymeric drug.

A. Precursor Polymer Preparation

A stock of poly(vinylacetamide) was prepared by (1) condensing acetamide and acetaldehyde in the presence of acid to form ethylidene bisacetamide, (2) cracking the ethylidene bisacetamide to give vinyl acetamide and (3) polymerizing the vinyl acetamide. This preparation is described in detail in *J. Am. Chem. Soc.* 98, 5996 (Sept. 15, 1976) and for brevity is not here described in detail. The polymer product was purified by ultrafiltration to remove low molecular weight materials to yield a product having a median molecular weight by gel permeation comparison to polystyrene standards ($M_p^{ps}$) of $1.2 \times 10^5$. This polymer was hydrolyzed with hydrochloric acid as follows:

A 10-15 wt% solution of poly(vinylacetamide) in water containing 1.4 equivalents of hydrochloric acid was heated at reflux under argon for 20 hours to obtain a homogeneous aqueous poly(vinylamine hydrochloride) solution.

The crude product of this hydrolysis was an aqueous solution having the following general composition:

| | |
|---|---|
| Poly(vinylamine) hydrochloride | 1.4–2.2 meq/g |
| Acetic Acid | one mole per mole of poly(vinylamine) hydrochloride |
| Free Cl⁻ | 0.56–0.88 meq/g |
| HCl | 0.3–1.1 meq/g |
| Water | remainder |

B. Schotten-Baumann Reaction and Hydrolysis

The crude product of Part A was used directly in a Schotten-Baumann coupling by adding base (NaOH) and 2-methoxyethanol to give a clear homogeneous pH 9-10 solution containing about 2% by weight poly(vinylamine) (as amine) and 62% by volume 2-methoxyethanol. p-Acetamidobenzenesulfonyl chloride (1.2 equivalents, basic polymeric amine units) was then added in 3 equal portions with agitation while the pH was maintained in the range 9.5-10 by the addition of base. The agitation was continued at ambient conditions and pH was maintained at 9-11 by base addition for 2 hours after the last addition of sulfonyl chloride to yield a homogeneous solution of

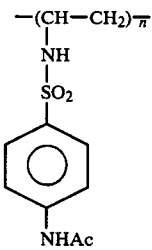

polymer.

This polymer solution was directly hydrolyzed without prior isolation of the polymer therefrom by adding 3.5 equivalents (basis acetamido unit) of concentrated HCl and heating to 80° C. for 4 hours with agitation. This hydrolyzed the acetamido units to amines. The presence of the 2-methoxyethanol was responsible for being able to carry out the Schotten-Baumann coupling and the "Schotten-Baumann product" hydrolysis as an unbroken sequence without isolation of intermediates or resorting to troublesome emulsions or suspensions.

C. Diazotization

A 3.7 kg batch of

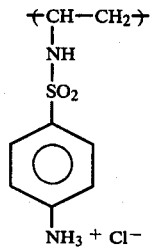

in a 2-methoxyethanol/water solution as prepared in Part B (total weight 50.76 kg) was stirred overnight with 2.657 kg of hydrochloric acid (21° Baumé) and 2.31 kg of deionized water. This yielded 55.6 kg (50.6 liters) of solution.

The diazotization was carried out in a continuous high speed flow system employing a pair of ganged peristaltic pumps to feed the polymer solution and a sodium nitrite solution.

The dual peristaltic pump system was set up using a Masterflex TM motor drive and controller model number 7545 fitted with pump head number 7018 which was equipped with silicone tubing (0.4390" O.D., 0.3130" I.D.) for pumping polymer solution. Because of the flexible nature of this tubing, it was supported (outside the pump housing) by fitting it with a "sleeve" of more rigid, reinforced Tygon TM tubing. The motor drive was also fitted with Masterflex TM pump head number 7016 equipped with silicone tubing (0.2510" O.D., 0.1250" I.D.) for transfer of nitrite solution. The flow ratio for the two pumps was 4:1 by measuring the volumes of liquids pumped for a short time interval. At this flow ratio, the volume of nitrite solution required was determined to be 13.9 1=[50.55 1 (vol. polymer soln.)×0.25 (flow ratio)×1.1 (safety factor)]. A solution of 1.738 kg of sodium nitrite (1.2 equivalents) was prepared and diluted to 13.9 l with deionized water.

A 1 l, four-necked, round-bottom flask was set up with an efficient overhead stirrer and a large diameter outlet tube leading to a 30 gallon polyethylene tank equipped with a thermocouple. The exit tubes of the ganged pumps were positioned inside the flask through the other two necks. The flask was than charged with 500 ml of deionized water.

The coupling reaction system was then set up. A 100 gallon polyethylene tank was equipped with an air-driven overhead stirrer, a centrifugal pump (Flotec Model C6P8 with 3⅛" or 4" impeller), a peristaltic pumping system for the addition of 50% sodium hydroxide solution (capacity greater than 4 l/hr), and a pH probe which had been calibrated in pH 12.0 buffer at 25° C. The centrifugal pump was fitted with a "T" fitting at the pump inlet to allow for the simultaneous intake of polymeric diazonium solution and circulating coupling reaction medium with mixing occurring in the impeller housing. The tank was then charged with 40 gallons of deionized water and 6.83 kg (49.49 moles; 2.38 equiv., basis total aromatic amine by actual assay) of salicyclic acid. The air-driven stirrer was turned on to moderate speed and sufficient sodium hydroxide was added to dissolve the salicyclic acid and raise the solution pH to 12.5. Ice was loaded into the tank until a temperature of 10°-13° C. was achieved.

At this point, both reaction systems were ready. The stirrer of the 1 l flask mixing chamber for the diazotization was turned on to moderate speed and 25 ml of the prepared sodium nitrite solution and 5 ml of 21° Baumé hydrochloric acid were added. The pump exit tubes were adjusted to discharge their reactant streams below the surface of circulating liquid and the stirrer was then turned on full. The ganged peristaltic pumps' motor drive was turned on to maximum output to initiate the diazotization reaction. Aliquots were taken periodically during the course of the reaction from the mixing chamber outlet tube, and all were found to be visually clear and precipitate-free.

When all the polymer solution had been added (29.1 minutes required), the pump motor drive was immediately turned off. The solution remaining in the mixing chamber was added to the diazonium solution reservoir tank and this material was used immediately in the coupling reaction. (Some sodium nitrite solution remained but was discarded).

Introduction of the polymeric diazonium solution into the circulating coupling medium was initiated by removing a clamp from the inlet tubing which had been placed near the "T" fitting. Addition of the 17.5 gallons of diazonium solution required 113 minutes (average addition rate was 585 ml/minute). The reaction pH was maintained in the range 12.6-12.9 by the concurrent addition of 50% hydroxide solution below the reaction medium surface while the reaction temperature was maintained in the range of 10°-13° C. by the addition of ice as necessary. At the conclusion of the polymer addition, the centrifugal pump was turned off but reaction mixing was continued via the overhead stirrer for an additional hour. At the end of this time, the agitator was turned off and the mixture was allowed to stand overnight while warming to 20° C.

The reaction mixture was transferred to a tared 100 gallon tank using approximately 10 l of rinse water. The total weight was 327.6 kg. A 300 ml sample was removed and, via centrifugation, was shown to contain no precipitated material. A 262.5 g portion of this material was readily passed through a glass fiber (GF/A) filtration disk and ultrafiltered with deionized water make-up for 20 diavolumes. The resultant solution was lyophilized to afford 3.64 g of orange solid l, which extrapolated to a batch yield of 4.54 kg.

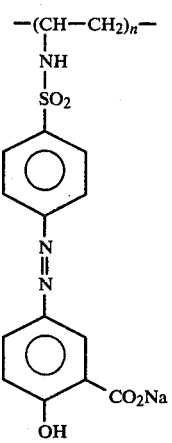

D. Utility of the Product

The product of step C is identical to the product shown in U.S. Pat. No. 4,190,716 which product is there shown to effectively release the desirable intestinal drug, 5-aminosalicyclic acid, in the bowel.

EXAMPLE II

A series of experiments were conducted varying the amount of 2-methoxyethanol and substituting 2-ethoxyethanol in the reaction sequence of Example I run at smaller scale.

a. Amount of 2-methoxyethanol

By employing an isolated poly(vinylamine) it was possible to run the Schotten-Baumann reaction in 90%+2-methoxyethanol/water. A homogeneous reaction mixture resulted. At 2-methoxyethanol concentrations of less than 50%, there was some evidence of cloudiness (emulsion). At concentrations below 33% the reaction mixture was definitely an emulsion.

b. Use of 2-ethoxyethanol.

The reaction sequence of Example I and Example II a was conducted using 2-ethoxyethanol in place of 2-methoxyethanol. Equivalent results were observed.

COMPARATIVE EXPERIMENTS t-Butanol and 2-propanol were each tested. They did not form clear aqueous solutions as desired. Pyridine was tested; while it did form a clear aqueous solution, its high cost, toxicity and offensive odor ruled it out. In addition, it instantly boosted the reactivity of sulfonyl halides to the point of instant hydrolysis and very poor attachment. DMF was also tested but was ruled out by cost and possible reactivity at the conditions of use.

EXAMPLE III

Other Schotten-Baumann couplings. Following the general procedure of Example I a variety of other applications of the use of 2-alkoxyethanols of the present invention are investigated. The following backbones are substituted for the poly(vinylacetamides) used in Example I and Example II.

Poly(vinylacetamide) of $M_p^{ps}$ $6 \times 10^4$
Poly(vinylacetamide) of $M_p^{ps}$ $4 \times 10^5$
1:1 Copoly(vinylacetamide-ethylene) of $M_p^{ps}$ $1 \times 10^5$
Poly(ethyleneamine)
Poly(diallylamine)
Linear Poly(ethyleneamine)
Poly(N-methylvinylacetamide) of $M_p^{ps}$ $5 \times 10^4$ The following Schotten-Baumann reagents and azo coupling reagents are substituted to give the indicated products:

| Schotten Baumann Reagent | Azo Coupling Reagent | Product |
|---|---|---|
| as in I | Schaeffer's salt | Polymeric Yellow Dye |
| as in I | Pyrazolone T | Polymeric Yellow Dye |
|  | 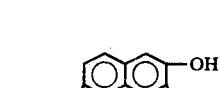 | Polymeric Red Dye |

What is claimed is:

1. In the process wherein an aromatic sulfonyl halide is reacted with primary alkyl amine groups present on a polymeric alkyl amine under basic conditions in a liquid reaction medium, the improvement that comprises employing as said liquid reaction medium a mixture comprising water and from 40 to 90% of an alkoxyethanol selected from 2-methoxyethanol and 2-ethoxyethanol.

2. The process of claim 1 wherein said medium is an aqueous mixture comprising from 40 to 70% 2-methoxyethanol.

3. The process of claim 2 wherein said polymeric alkyl amine contains vinylamine units.

4. The process of claim 3 wherein said polymeric alkyl amine is poly(vinylamine).

5. The process of claim 4 wherein said aromatic sulfonyl halide is p-acetamidobenzenesulfonyl halide.

6. The process of claim 5 wherein said halide is chloride.

7. The process of claim 1 wherein said medium is an aqueous mixture comprising 40 to 70% 2-ethoxyethanol.

8. The process comprising
   a. hydrolyzing poly(vinylacetamide) at elevated temperature to form a solution of poly(vinylamine) in water,
   b. without isolation of the poly(vinylamine), admixing said solution with base and alkoxyethanol selected from 2-methoxyethanol and 2-ethoxyethanol to form a pH 9–11 homogeneous cosolvented solution comprising from 40 to 70% alkoxyethanol,
   c. admixing said cosolvented solution with from 1 to 2 moles of p-acetamedobenzenesulfonyl chloride per mole of poly(vinylamine) salt under coupling conditions to form a homogeneous solution of product polymer having

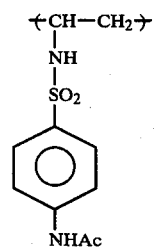

repeat units and,
   d. without isolation of said product polymer, hydrolyzing said repeat units to amine salts by heating in the presence of excess mineral acid.

* * * * *